April 26, 1960 L. MIXSON 2,934,393
APPARATUS FOR RECORDING EGG PRODUCTION
Filed Sept. 18, 1959 4 Sheets-Sheet 1
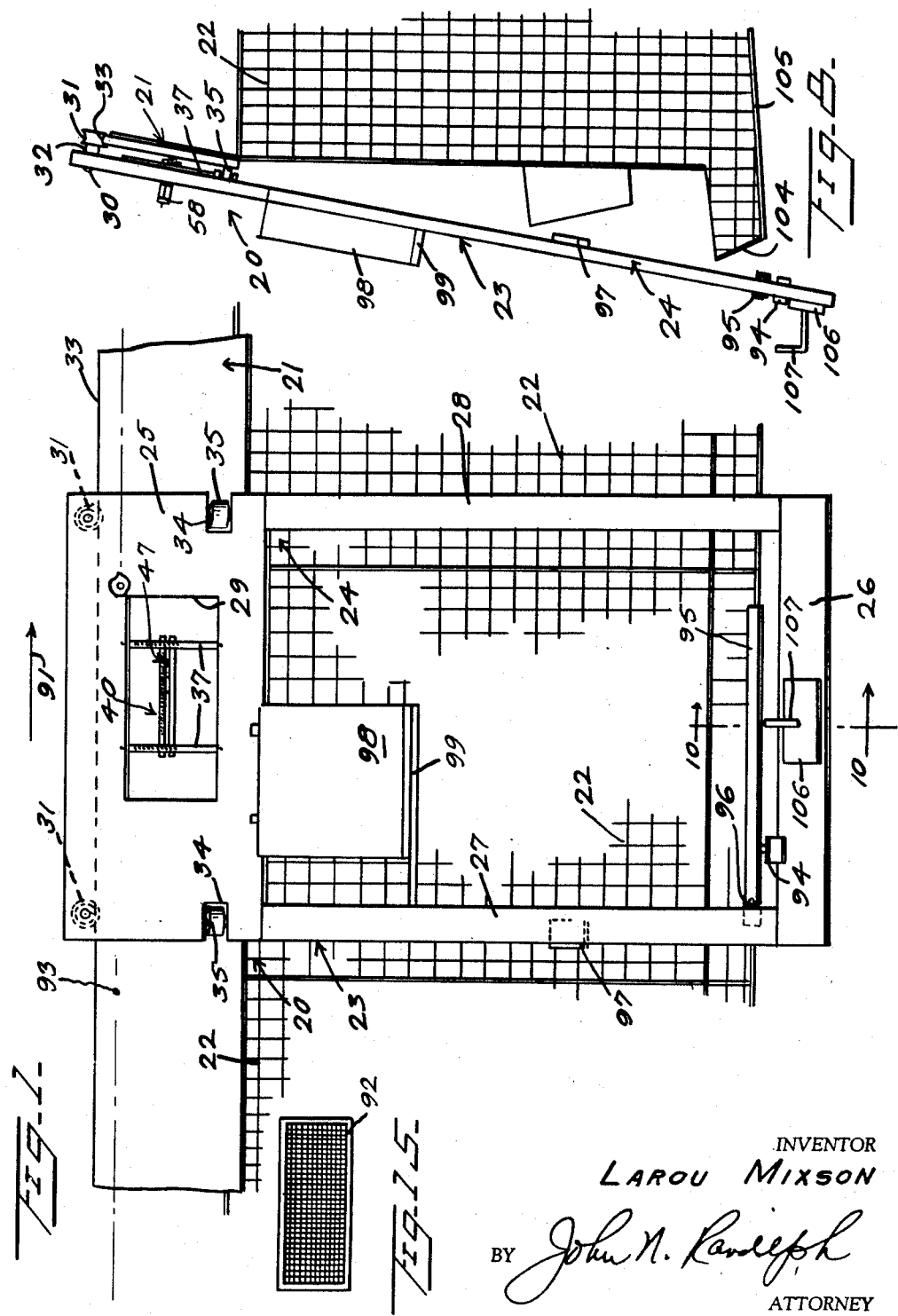
INVENTOR
LAROU MIXSON
BY John N. Randolph
ATTORNEY

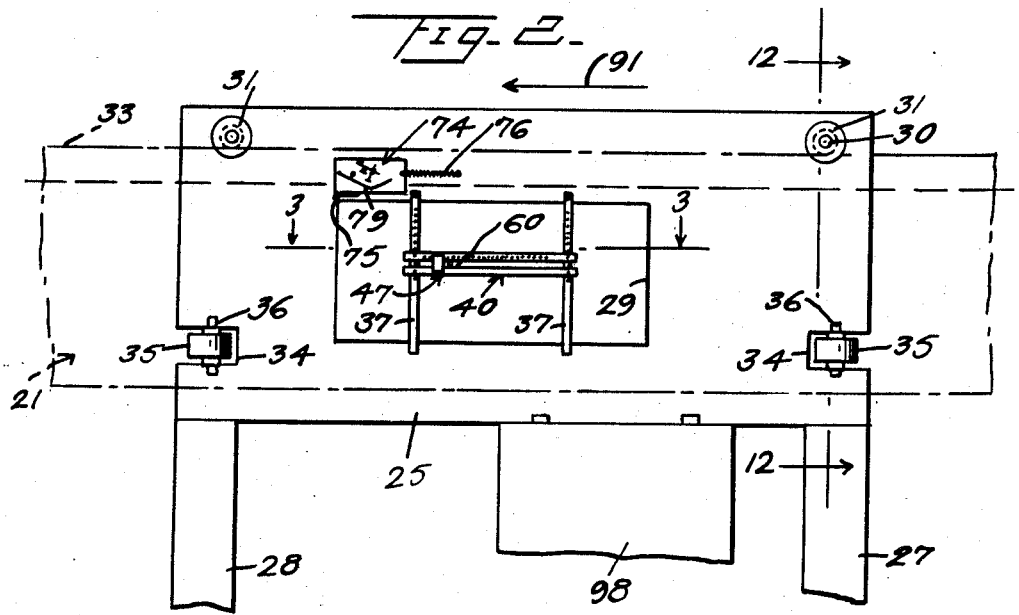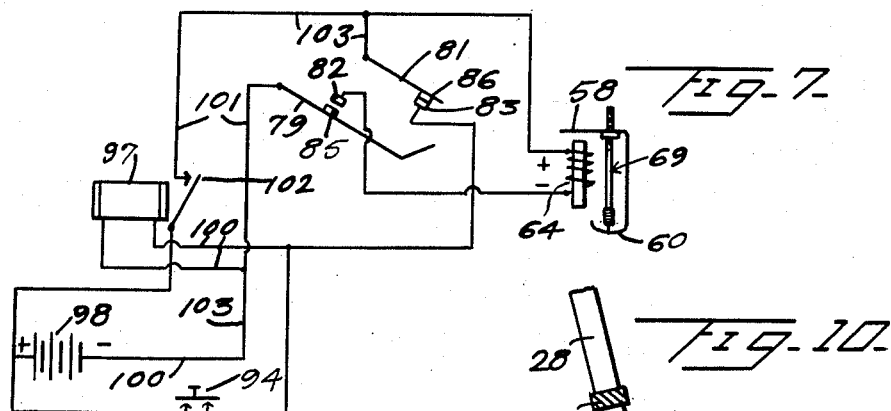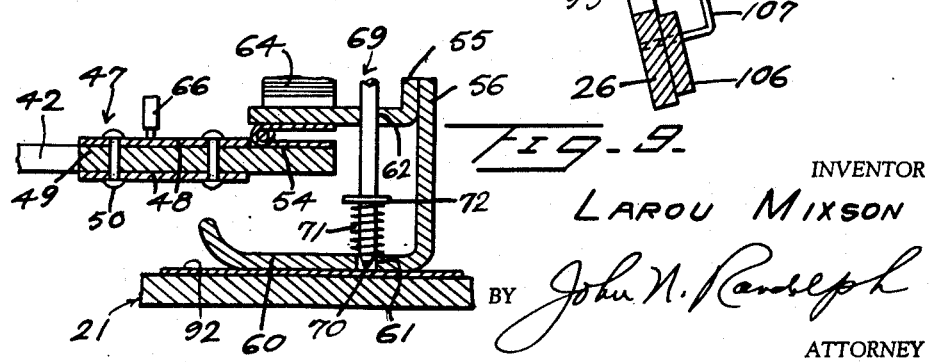

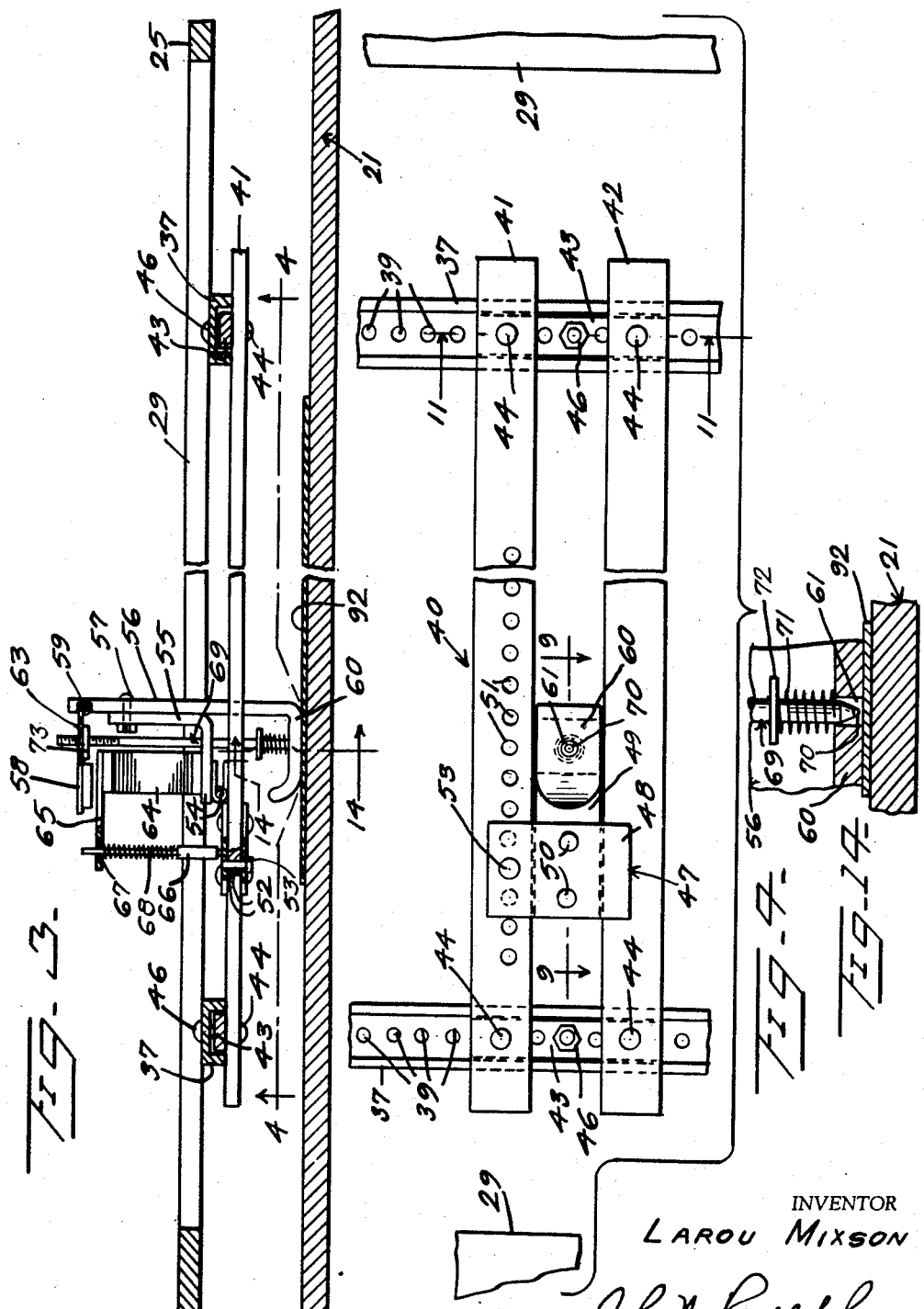

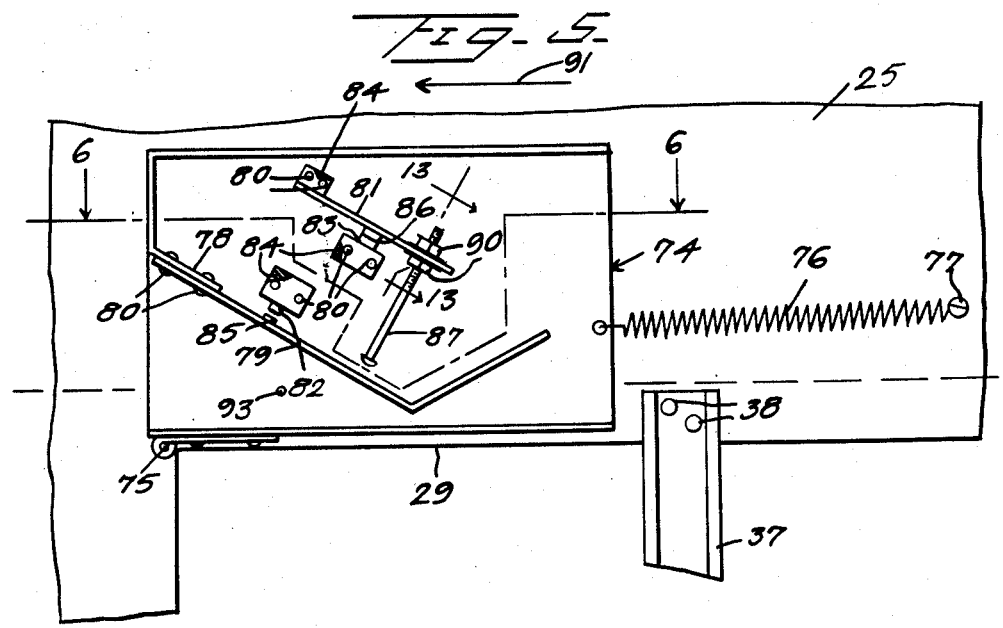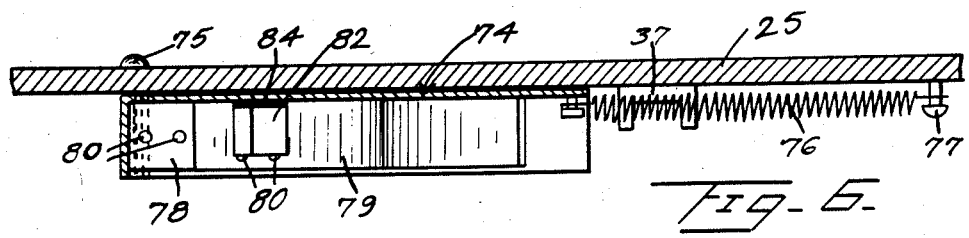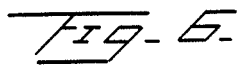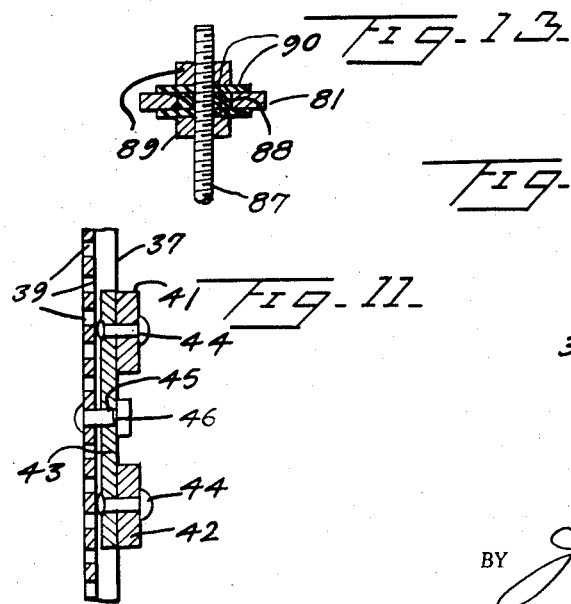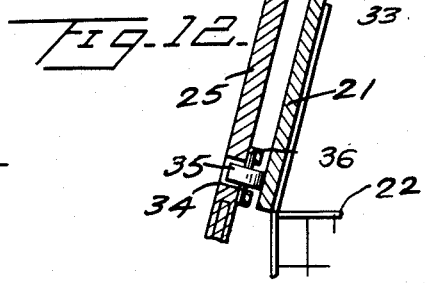

United States Patent Office 2,934,393
Patented Apr. 26, 1960

2,934,393

APPARATUS FOR RECORDING EGG PRODUCTION

Larou Mixson, Enterprise, Ala.

Application September 18, 1959, Serial No. 840,959

8 Claims. (Cl. 346—25)

This invention relates to an apparatus for use in poultry farms for quickly and accurately recording the eggs produced by caged hens and, more particularly, the production of each hen.

In such poultry farm operation, laying hens are kept in individual cages and an aisle extends between two adjacent batteries of cages. The cages have inclined bottoms which protrude beyond the fronts of the cages and down which the eggs can roll to an exposed position so that the eggs can be gathered by a poultryman moving along the aisle. It is customary to mount a card above each cage and which card has rows of squares or boxes, including a horizontal row for each month and an individual box in each row for each day of the month. As the poultryman picks up an egg from in front of a cage he makes a mark with a pencil in the proper square of the card above the cage for that particular day of the month. By means of such a daily record of the egg production of each hen, the poultryman can determine when to replace a hen which is not producing a sufficient number of eggs. However, considerable time is required to maintain this daily record for each hen and there is considerable likelihood of error in making the correct recordings.

Accordingly, it is a primary object of this invention to provide an apparatus which is semiautomatic in operation and which can be caused to travel along with the poultryman collecting the eggs and which can be quickly and easily operated by him for accurately recording the eggs produced by each hen, to thus provide an apparatus which will effect a substantial saving in labor and also produce more accurate records.

Various other objects and advantages of the invention will hereinafter become more fully apparent from the following description of the drawings, illustrating a presently preferred embodiment thereof, and wherein:

Figure 1 is a fragmentary front elevational view of the recording apparatus;

Figure 2 is an enlarged fragmentary rear elevational view of the upper portion of the apparatus;

Figure 3 is an enlarged horizontal sectional view, taken substantially along a plane as indicated by the line 3—3 of Figure 2;

Figure 4 is a fragmentary elevational view, taken substantially along the line 4—4 of Figure 3;

Figure 5 is an enlarged fragmentary plan view looking toward the inner or rear side of a part of the apparatus;

Figure 6 is a sectional view, taken substantially along the line 6—6 of Figure 5;

Figure 7 is a diagrammatic view of the electric circuit of the apparatus;

Figure 8 is an end elevational view of the apparatus, looking from right to left of Figure 1;

Figure 9 is an enlarged fragmentary substantially horizontal sectional view, taken substantially along the line 9—9 of Fig. 4;

Figure 10 is a fragmentary cross sectional view taken approximately along the plane of the line 10—10 of Figure 1;

Figure 11 is an enlarged transverse sectional view, taken approximately along the line 11—11 of Figure 4;

Figure 12 is a transverse sectional view taken along the line 12—12 of Figure 2;

Figure 13 is an enlarged fragmentary sectional view taken along the line 13—13 of Figure 5;

Figure 14 is an enlarged transverse sectional view, taken along the line 14—14 of Figure 3, and Figure 15 is a front elevational view of one of the record cards.

Referring more specifically to the drawings, the egg recording apparatus in its entirety is designated generally 20 and includes an elongated supporting rail 21 which is disposed above and adjacent the fronts of a battery of cages 22, each of which contains a laying hen. The rail 21 is of substantial width relative to its thickness, as seen in Figures 8 and 12, and is positioned at a slight incline from its lower to its upper edge with the upper edge thereof being disposed rearwardly relative to the lower edge, so that the rail is inclined downwardly and outwardly with respect to the fronts of the cages 22. Any suitable means, not shown, may be provided for supporting the rail 21 at its ends and said rail may be formed of any suitable rigid material.

A carrier, designated generally 23, is supported by and travels from end-to-end along the rail 21 in front of the cages 22, above which said rail is disposed. The carrier 23 includes an elongated open rectangular frame 24 which is elongated in a vertical direction and which includes a relatively wide top portion 25 which extends from side-to-side of the frame, a narrow bottom portion or bar 26, which also extends from side-to-side of the frame 24, and substantially vertical side portions 27 and 28, which extend between and are secured to the ends of the top portion 25 and bottom portion 26. The top portion 25 has a large rectangular opening 29 which is elongated in a direction lengthwise thereof and which is spaced from the ends of said top portion.

Shafts 30 extend through the upper corners of the frame portion 25 and grooved rollers 31 are journaled on said shafts 30 and are disposed behind the carrier frame 24 and are maintained spaced therefrom by spacing washer 32. The grooved rollers 31 engage and ride on the top edge 33 of the rail 21. Notches 34 are formed in the ends of the top frame portion 25, near its bottom edge to accommodate rollers 35 which are journaled on axles 36. The axles 36 are secured to the inner or rear face of the frame portion 25, above and beneath the notches 34, so that the rollers 35 protrude from said inner face toward the rail 21. The rollers 35 bear against the outer or front face of the rail 21, as seen in Figure 12, to cooperate with the rollers 31 for supporting the carrier frame 24 upon the rail 21 and in a plane substantially parallel to said rail, as best seen in Figure 8.

A pair of bars 37 of channel shape cross section extend transversely across the opening 29 and are secured at their ends to the frame part 25 above and beneath said opening 29 by fastenings 38, as best seen in Figure 5. Each bar 37 is provided with a row of twelve spaced openings 39, the openings of which bars are disposed in horizontal alignment. A slide supporting unit 40 includes two bars 41 and 42 which are disposed coplanar and in spaced apart substantially parallel relation to one another and which are connected together adjacent their ends by transversely extending connecting bars 43 which are secured by fastenings 44 to the bars 41 and 42. The bars 43 are both disposed on the same sides of the bars 41 and 42 and are spaced apart a correct distance to slidably engage in the channels of the bars 37 and each has an opening 45, located between the bars 41 and 42.

The openings 45, as seen in Figure 11, are selectively aligned with the openings 39 of the bars 37 to receive fastenings 46 for adjustably securing the slide supporting unit 40 to the bars 37.

A slide 47 includes plates 48 and a spacing bar 49 which is disposed between the intermediate portions of the two plates 48 and which is secured thereto by fastenings 50. The bar 49 fits slidably between adjacent edges of the bars 41 and 42 and is of sufficient thickness so that the end portions of the plates 48 slidably straddle the bars 41 and 42. The bar 41 has a row of thirty-one longitudinally spaced openings 51 and the ends of the plates 48 which straddle said bar 41 have aligned openings 52 which selectively align with the openings 51 for receiving a pin 53 for adjustably securing the slide 47 to the slide support 40. The spacing bar 49 has an end projecting beyond corresponding edges of the plates 48, as best seen in Figure 9, to one side of which is secured one leaf of a hinge 54. The shorter leg of an angle bracket 55 is secured to the other leaf of the hinge 54. The other longer leg of the angle bracket 55 extends outwardly through the opening 29 and is disposed beyond said exposed end of the bar 49. A bar 56 is secured by a fastening 57 to said longer leg of the angle bracket 55 and has one end extending beyond the outer end of said bracket leg and to which one end of a metal strip 58 is pivotally connected, as seen at 59, for swinging movement longitudinally of the bar 56. The other end of the bar 56 extends through the opening 29 and through the gap between the bars 41 and 42 and is turned laterally to provide a foot member 60 having an upturned terminal end. The foot member 60 has an opening 61, as seen in Figure 9, which aligns with an opening 62 of the shorter leg of the bracket 55 and with an opening 63 formed in the strip 58.

One end of an electromagnet coil 64 is secured to the shorter leg of the bracket 55, over the hinge 54 and in offset relation to the opening 62, and the other end of the coil 64 terminates adjacent a part of the strip 58, which constitutes the armature of the electromagnet 58, 64. A bar 65 is secured to and extends laterally from the last mentioned end of the coil 64, and in a direction away from the bracket 55. A post 66 is fixed to the slide 47 and projects therefrom outwardly through the opening 29 and has an outer portion extending loosely through an opening 67 in the bar 65. A compression spring 68 is mounted on the post 66 and bears against the bar 65 for exerting a force tending to cause the bracket 55 to swing about the axis of the hinge 54 for urging the foot member 60 toward the rail 21.

A scribing element 69, which may be similar to a ball-point refill extends slidably through the openings 61, 62 and 63. As seen in Figure 9, the point 70 of the scriber 69 is normally disposed within the opening 61. A compression spring 71 is mounted on a part of the scriber 69, between the foot 60 and a collar 72 which is secured to the scriber barrel. Another collar or stop 73 is adjustably mounted on the scriber barrel and bears against the inner side of the strip 58 around the opening 63 and is adjusted so that the spring 71 can normally retain the scriber point 70 in its retracted inoperative position, as seen in Figures 9 and 14.

A switch plate 74 is mounted on the inner side of the frame portion 25 above an end of the opening 29, and is disposed longitudinally of said opening, as seen in Figure 2. The switch plate 74 is connected to the frame part 25 by a pivot pin 75 which is located at the lower forward corner of said switch plate and adjacent the upper corner of said end of the opening 29, to mount the switch plate for up and down swinging movement relative to the frame portion 25. One end of a contractile spring 76 is attached to the opposite end of the plate 74 and the opposite end of said spring 76 is anchored by a fastening 77 to the frame part 25, for normally maintaining the switch plate 74 in its position as shown in Figures 2 and 5 but so as to permit said switch plate to swing upwardly or downwardly about its pivot 75. The switch plate 74 has a flange 78 disposed above and spaced from the pivot 75 and which projects outwardly from the exposed side of the switch plate and is inclined downwardly and rearwardly. One end of a switch blade 79 is secured by fastenings 80 to the underside of the flange 78 and said switch blade, which is resilient and formed of electrical conducting material, extends downwardly at an incline in a rearward direction to adjacent the level of the bottom edge of the plate 74 and has an upwardly inclined rear end portion. The switch blade 79 is shown in its normal position in Figures 2 and 5 from which it is capable of flexing upwardly or downwardly relative to its rigid support 78. One end of a resilient switch blade 81 is secured by additional fastenings 80 to the plate 74. The switch blade 81 extends from its secured end toward the free end of the blade 79 and is disposed substantially parallel to the downwardly and rearwardly inclined part of the blade 79. Two stationary contacts 82 and 83 are secured by additional fastenings 80 to the exposed side of the plate 74, between the switch blades 79 and 81. The contacts 82 and 83 and the switch blade 81 are electrically insulated from the plate 74 by the insulating strips 84, as seen in Figure 5. A switch contact 85 is carried by the blade 79 to engage with the switch contact 82 but is normally disposed out of engagement therewith, as seen in Figure 5. A switch contact 86 is carried by the blade 81 and is normally in engagement with the switch contact 83. A screw 87 has a threaded end extending through an opening in the blade 81, near the free end of said blade, and which opening 88 is substantially larger than the screw. Nuts 89 engage the screw on opposite sides of the blade 81. Electrical insulating washers 90, as seen in Figure 13, are mounted on the screw 87 within the opening 88 and between opposite sides of the blade 81 and the nuts 89 for insulating said screw from the blade 81. The spacing between the other end or head of the screw 87 and an adjacent part of the blade 79 can be varied by adjustment of the nuts 89, for a purpose which will hereinafter become apparent.

The direction of movement of the carrier 23 relative to the rail 21 is illustrated by the arrows 91 in Figures 1, 2 and 5. A card 92 is secured to the front face of the rail 21 above each cage 22 and a pin 93 projects outwardly from the front side of the rail 21 above each cage 22 and beneath but adjacent the upper edge 33 of the rail 21. Each card 92 is ruled horizontally and vertically and is elongated horizontally to provide twelve horizontal rows of squares each containing at least thirty-one squares, each row being for a month of the year and each row having a square for each day of the month.

A conventional normally open pushbutton switch 94 is fixed to and projects upwardly from the bottom rail 26 of the frame 24. A long actuating lever 95 is pivotally mounted on a bracket 96 which is supported by the bar 27 and is disposed for up and down swinging movement above the bottom bar 26 and has a portion normally resting upon the pushbutton switch 94. A holding relay 97 is mounted in a convenient location on the frame 24, and a current source 98, such as a six volt battery is mounted on and secured to a bracket 99 which is also supported by a part of the frame 24, as seen in Figure 1.

Figure 7 illustrates the electric circuits of the apparatus 20. The switch 94 is interposed in an electric circuit 100 which includes the holding relay 97 and current source 98. The current source 98 and electromagnet coil 64 are interposed in an electric circuit 101 which includes the armature 102 of the holding relay and the normally open switch 82, 85. The holding relay 97 and current source 98 also form a part of a third electric circuit 103 which includes the armature 102, and normally closed switch 83, 86.

The carrier 23, suspended from the upper edge 33 of the rail 21 by the rollers 31, as previously described, is propelled along the rail 21 in the direction as indicated by the arrows 91 by the poultryman as he moves down the aisle in front of the cages for gathering the eggs from the tray 104 which forms a forward extension of the downwardly and forwardly inclined bottoms 105 of the cages 22, and which permits the eggs to roll beyond the fronts of the cages to positions accessible to the poultryman. As the poultryman picks up an egg from the tray 104 in front of a cage 22 he exerts a downward pressure on the lever 95, assuming that the carrier 23 is disposed in front of said cage. This closes the pushbutton switch 94 to complete the circuit 100 for energizing the holding relay 97 and to cause the armature 102 thereof to assume a position for closing the circuit 103 so that the holding relay 97 will be maintained energized when pressure is released on the lever 95 and the pushbutton switch 94 returns to its normally open position. As the carrier 23 is then moved further in the direction as indicated by the arrow 91 and while it is still in front of the same cage 22, the foot member 60 will move partially across the card 92 for said cage 22 and the switch plate 74 will commence to pass the pin 93 of said cage 22. The pin 93 is disposed at a proper level, as seen in Figure 5, so that the downwardly and rearwardly inclined portion of the blade 79 will strike said pin and will be sprung upwardly thereby. During the initial upward swinging movement of the blade 79 the switch contact 85 will engage the switch contact 82 to complete the circuit 101 for energizing the electromagnet coil 64. As the armature 58 is drawn toward the magnetized coil 64 the scriber 69 will be projected through the openings 61 and 62 to cause the point 70 to mark the card 92. A further slight movement of the carrier relative to the pin 93 will result in the blade 79 being deflected upwardly further and until it strikes the screw 87 and forces said screw upwardly for deflecting the blade 81 upwardly. When this occurs the switch contact 86 is displaced out of engagement with the switch contact 83 to break the circuit 103, thereby de-energizing the holding relay 97 so that the armature 102 returns to its position of Figure 7 for breaking the circuit 101. As the bottommost portion of the blade 79 thereafter passes over the pin 93 the switch 82, 85 will resume its open position. The length of the mark made by the scriber point 70 can be varied by adjustment of the screw 87.

The location of the part of the blade 79 engaged by the pin 93 relative to the location of the scriber point 70 determines the position at which the mark is made on the card 92. Thus, by adjusting the scriber up and down relative to the opening 29, by positioning the fastenings 46 in different ones of the openings 39, and by adjusting said scriber longitudinally of the opening 29, by positioning the pin 53 in different ones of the openings 51, a mark can be accurately scribed on any space of the card 92. It will be understood that the slide 47 is moved daily the distance between two adjacent openings 51 during each month and that the slide support 40 is moved downwardly the distance between two adjacent openings 39 for each new month. When this latter adjustment is made, the slide 47 is moved back to the starting point of the month with the pin 53 placed in the first opening 51. It will be understood that the same operation is repeated as the carrier 23 arrives in front of each cage from which an egg is collected. Where no egg is collected from beneath and in front of a cage the switch 94 is not manually closed by operation of the lever 95 and thus no mark is made on the card. The spring 76 is provided to allow the switch plate 74 to swing upwardly to enable the blade 79 to pass over the pin, should the pin be slightly too high or should the screw 87 be improperly adjusted so that the blade 79 could not yield upwardly sufficiently to ride over the pin. The spring 76 will normally retain the switch plate 74 with its bottom edge substantially horizontal, as seen in Figure 5.

As best seen in Figure 10, a cleat 106 is attached to the outer side of the bottom bar 26 and an upwardly opening hook 107 is supported by the cleat 106 and bar 26. The hook 107 is utilized when two of the carriers 23 are operated simultaneously on opposite sides of an aisle and a basket or other receptacle, not shown, may be suspended from the hooks 107 of the two carriers 23 for receiving the eggs as they are gathered from the trays on both sides of the aisle. Each egg recording apparatus 20 is then operated in the aforedescribed manner.

Various modifications and changes are contemplated and may be resorted to, without departing from the function or scope of the invention as hereinafter defined by the appended claims.

I claim as my invention:

1. An apparatus for recording egg production comprising a rail adapted to be disposed to extend along a battery of cages and having a forward side facing outwardly from the cages, a recording card fixed to said forward side in alignment with each cage, a pin projecting outwardly from said forward side of the rail and in alignment with each cage, a carrier including a frame having an upper portion and a lower portion, means supported by the upper portion of said frame and engaging said rail for suspending the frame from the rail and for mounting the frame for movement along the rail, a scriber supported by said upper portion of the frame and disposed for movement along said forward side of the rail and over said recording cards and including a spring for normally retaining the scriber in a retracted, inoperative position, electrically operated means carried by said frame for moving said scriber to a projected operative position for marking the card when a circuit of said electrically operated means is energized, said electrically operated means including a first electric circuit including a manually operated switch, a second circuit energized by the closing of the manually operated switch and constituting a holding circuit, and a third circuit for effecting movement of the scriber to an operative position, switch means carried by the upper portion of said frame including a deflectable part disposed to be engaged by each of the pins and deflected by contact therewith for initially closing the third circuit and for thereafter breaking the second holding circuit to de-energize said third circuit to permit said spring to retract the scriber.

2. An apparatus as in claim 1, and means for varying the position of said scriber on said upper part of the frame for varying the location of the scriber relative to said deflectable part for varying the position at which the mark will be made on the recording card by the scriber when the third circuit is energized.

3. An apparatus for recording egg production as in claim 2, said last mentioned means including separate adjustments for adjustably positioning the scriber in two directions at right angles to one another relative to said frame.

4. An apparatus for recording egg production as in claim 1, means supporting said scriber on the upper part of the frame and in which said scriber is reciprocably mounted, said last mentioned means including a foot member disposed to slidably engage the recording cards and having an opening through which the scriber point is projected, said last mentioned means including a resilient unit yieldably retaining the foot member in engagement with the recording cards.

5. An apparatus for recording egg production as in claim 1, said first mentioned means comprising grooved rollers engaging the upper edge of the rail and rollers engaging the front side of the rail and cooperating with said grooved rollers for maintaining the frame substantially parallel to the rail and the upper part of the frame spaced outwardly a predetermined distance from the front side of the rail.

6. An apparatus for recording egg production as in claim 5, said rail being disposed above the battery of cages and at an incline downwardly and outwardly, and said carrier being suspended from said rail to extend downwardly and outwardly in the front of the cages.

7. An apparatus for recording egg production as in claim 1, and manually adjustable means forming a part of said switch means for varying the extent of movement of said deflectable part under the biasing action of the pin to effect breakage of the second holding circuit for varying the length of the mark made by the scriber on the recording card.

8. An apparatus for recording egg production as in claim 1, said pushbutton switch being supported by said lower part of the frame, a lever mounted for vertical swinging movement in said frame and having a part resting on said pushbutton switch, said lever being adapted to be manually engaged and displaced downwardly for momentarily closing the pushbutton switch.

References Cited in the file of this patent

UNITED STATES PATENTS

| | | |
|---|---|---|
| 1,038,875 | Groves | Sept. 17, 1912 |
| 1,985,715 | Bucky | Dec. 25, 1934 |
| 2,068,642 | D'Almeida | Jan. 26, 1937 |
| 2,290,094 | Clausen | July 14, 1942 |
| 2,850,349 | Mandel | Sept. 2, 1958 |